(12) United States Patent
Aart

(10) Patent No.: US 6,249,711 B1
(45) Date of Patent: Jun. 19, 2001

(54) PROGRAMMABLE LOGICAL CONTROLLER

(75) Inventor: Van Dijk Aart, Stekene (BE)

(73) Assignee: Jan Willem Van Dijk, Stekene (BE)

( * ) Notice: Subject to any disclaimer, the term of this patent is extended or adjusted under 35 U.S.C. 154(b) by 0 days.

(21) Appl. No.: 08/983,478

(22) PCT Filed: Jul. 24, 1996

(86) PCT No.: PCT/BE96/00078

§ 371 Date: Jan. 22, 1998

§ 102(e) Date: Jan. 22, 1998

(87) PCT Pub. No.: WO97/04367

PCT Pub. Date: Feb. 6, 1997

(30) Foreign Application Priority Data

Jul. 24, 1995 (BE) .................................................. 09500644

(51) Int. Cl.⁷ .................................................. G05B 19/05
(52) U.S. Cl. .................................. 700/19; 700/9; 700/11; 700/18; 700/27
(58) Field of Search .................................. 700/27, 23, 18, 700/17, 11, 9, 2, 19

(56) References Cited

U.S. PATENT DOCUMENTS

| 5,068,778 | * | 11/1991 | Kosem et al. | 700/9 |
| 5,229,952 | * | 7/1993 | Galloway et al. | 700/200 |
| 5,253,129 | * | 10/1993 | Blackborow et al. | 360/69 |
| 5,340,210 | * | 8/1994 | Patel et al. | 366/132 |
| 5,349,518 | * | 9/1994 | Zifferer et al. | 700/87 |
| 5,372,238 | * | 12/1994 | Bonnet | 198/455 |
| 5,404,288 | * | 4/1995 | McDunn | 700/21 |
| 5,428,555 | * | 6/1995 | Starkey et al. | 700/275 |
| 6,169,929 | * | 1/2001 | Izzo et al. | 700/18 |

FOREIGN PATENT DOCUMENTS

608762A1 * 8/1994 (DE) ..................................... 700/29

OTHER PUBLICATIONS

J.S. Gerold, PC Control Software Combines Ladder Logic, HMI, and I/O, May 6, 1995, Control Engineering, vol. 42, pp. 56–57.*

* cited by examiner

Primary Examiner—William Grant
Assistant Examiner—Paul Rodriguez
(74) Attorney, Agent, or Firm—Dorsey & Whitney LLP

(57) ABSTRACT

A microcomputer is provided to generate PLC instructions. The microcomputer converts the PLC instructions into machine codes which are converted into execution instructions. The microcomputer is further provided with at least one hardware interface for controlling at least one controllable member. The hardware interface converts the execution instructions into control signals which are supplied to the controllable member. The controllable member connects on the hardware interface.

9 Claims, 2 Drawing Sheets

PROGRAMMABLE LOGICAL CONTROLLER

RELATED APPLICATIONS

This application claims the priority of PCT Application No. PCT/BE96/00078, filed Jul. 24, 1996 and Belgium Application No. 9500644, filed Jul. 24, 1995 which are incorporated herein by reference.

BACKGROUND OF THE INVENTION

The present invention relates to a microcomputer with an operating system comprising a bus structure on which at least a memory, a user interface and a central processing unit are connected, wherein the microcomputer further comprises an instruction generator, connected to the operating system, provided for generating programmable logical controller's instructions (PLC-instructions), and wherein further on said bus structure at least one hardware interface is connected which cooperates with the instruction generator, which instruction generator is further provided for converting the programmable logical controller's instructions into machine codes under control of the operating system, which central processing unit is provided for converting the machine codes into execution instructions and for supplying these execution instructions via said bus structure to the hardware interface, which hardware interface is provided for converting said execution instructions into control signals.

Microcomputers and in particular personal computers (PC's) have at present a lot of application possibilities. With some applications, devices or cards, such as for example an in/output card, are connected to PC's to realise a communication between PC and peripheral apparatus, connectable to this in/output card.

Upon controlling processes, where a number of motors have for example to be controlled and where certain parameters, such as position of objects, temperature, pressure and flow rate, must be monitored, it is known to use a Programmable Logical Controller (PLC), onto which the controllable members are connected. The PLC operates with its specific computer languages, which i.a. make use of time and ladder diagrams. Computer languages are also known which are established in the IEC1131 standard. A PC is here temporarily connected to a PLC and the PLC is in its turn connected to the controllable members. The PC is here used for programming the PLC or for loading it with a program. In order to achieve this, the PC must be provided with the required software to enable programming the PLC in its turn or to load it with a program. Once the PLC is programmed, the controllable members can be controlled by this PLC. The program is herein cyclically processed by the PLC, wherein the signals are received from and transmitted to the controllable members.

A microcomputer, in particular a personal computer, is known from Control Engineering, part 42, No. 6, May 1995, pages 56–57, XP 000527106. In this article, there is referred to the use of software in combination with such a microcomputer. The hardware interface, connected to the bus structure of the microcomputer, is herein provided to be connected to at least one in/output card of the PLC. The in/output card is in its turn connected to a controllable member. The used PLC comprises thus herein, with respect to classically used PLC, no further central processing unit, but use is made of the central processing unit of the microcomputer for processing the PLC-instructions.

A drawback of this latter system is that two devices are still required, i.e. a PC for generating and processing PLC-instructions and the PLC itself for controlling the member.

The object of the invention is to configure a PC in such a manner that it is, in addition to the usual PC function, also appropriate to exert a PLC function.

To this end, said hardware interface is further provided for supplying these control signals to at least one controllable member which is connectable onto said hardware interface and for receiving data supplied by said controllable member and forward them to said instruction generator.

Since the hardware interface is provided for supplying said control signals to at least one controllable member and for receiving data from the member, it is possible to program and to control the member, for example a motor, only by means of one device, i.e. the microcomputer according to the invention, by using PLC instructions. The microcomputer according to the invention is thus a microcomputer wherein PLC functions are integrated in the architecture and are executable by means of the microcomputer itself without requiring a separate PLC.

It has to be noted that PC-cards which are connected to a PLC and which are provided for generating PLC-instructions are known. These PC-cards comprise however an own operating system and form thus in fact a PC built-in in a PLC. It is further known to incorporate PLC-cards in a PC. These PLC-cards do not form however a part of the operating system of the PC and operate essentially autonomously from the PC. In these two known operating systems, two devices are consequently again required, i.e. a PC(-card) for programming a PLC, and the PLC(-card) for transmitting and receiving signals to controllable members. The classical architecture is thus also present here again.

Further systems are known, wherein a real-time operating system with multitasking is provided for processing data, for controlling members, and the like. Programming these systems occurs by means of PLC-instructions via an external programming device. Also here, two devices are required for programming and controlling a member. Further, use is here made of a real-time operating system, which is not necessary for the invention.

The systems known hitherto thus always start from a juxtaposition of a PC with a PLC, but not from a true combination of a PC with a PLC in one device.

SUMMARY OF THE INVENTION

According to a first preferred embodiment of the microcomputer according to the invention, said operating system is provided with priority management means. Since the instruction generator is connected to the operating system of the microcomputer according to the invention, these priority management means, known for certain operating systems, enable to assign a priority to a controller's instruction or a sequence of controller's instructions generated by the instruction generator.

According to a second preferred embodiment of the microcomputer according to the invention, said instruction generator is provided for generating programmable logical controller's instructions standardised according to a predetermined pattern. This predetermined pattern is then made to correspond with a pattern which is already used upon programming existing PLC's. Consequently, a user which already knows this pattern, is directly familiar with the microcomputer according to the invention and can use it immediately for generating PLC-instructions, without having to follow an extensive training.

According to a third preferred embodiment of the microcomputer according to the invention, symbols are stored in said memory, which symbols are provided to be retrieved by means of said instruction generator, to reproduce them on a monitor connected to a video adapter, and to supply instructions to said instruction generator under control of an activation signal. This enables to generate PLC-instructions in a quick, simple and conveniently arranged manner.

According to a fourth preferred embodiment, the microcomputer according to the invention comprises a symbol generator, provided for generating symbols, storing these generated symbols in the memory, which stored symbols are provided to be further retrieved from the memory by means of said instruction generator, to reproduce them on a monitor connected to a video adapter, and to supply instructions to said instruction generator under control of an activation signal. This enables the user to generate symbols himself, which give an appropriate illustration of the members to be controlled, to use them afterwards for generating PLC-instructions in a quick, simple and conveniently arranged manner.

According to a fifth preferred embodiment of the microcomputer according to the invention, said instruction generator is further provided for further using said symbols as a synoptic display on the monitor of the instructions executed by the controllable member upon processing. In this way, the instructions executed by the controlled member upon processing can be accurately followed on the monitor.

According to a sixth preferred embodiment of the microcomputer according to the invention, said hardware interface is a dedicated processing card provided for processing itself a number of the execution instructions and converting them in said control signals in order to supply them to the controllable member and for processing itself at least a part of the data, supplied by the controllable member, and for supplying thereby a control signal to the member. In this way, it is possible to enable direct processing of a number of the generated PLC-instructions by means of the programmable card instead of by means of the operating system of the microcomputer, whereby the controllable member is controlled less dependently from the central processing unit of the microcomputer (i.e. in real time). Certain signals are forwarded to the operating system of the microcomputer, so that it is informed that the instruction(s) is processed by the card. Consequently, the processing of at least a number of the instructions is performed by the card itself under supervision of the operating system of the microcomputer.

BRIEF DESCRIPTION OF THE DRAWINGS

The invention will now be described in details referring to the annexed drawings, wherein.

DETAILED DESCRIPTIONS OF THE PREFERRED EMBODIMENTS

Figure 1:
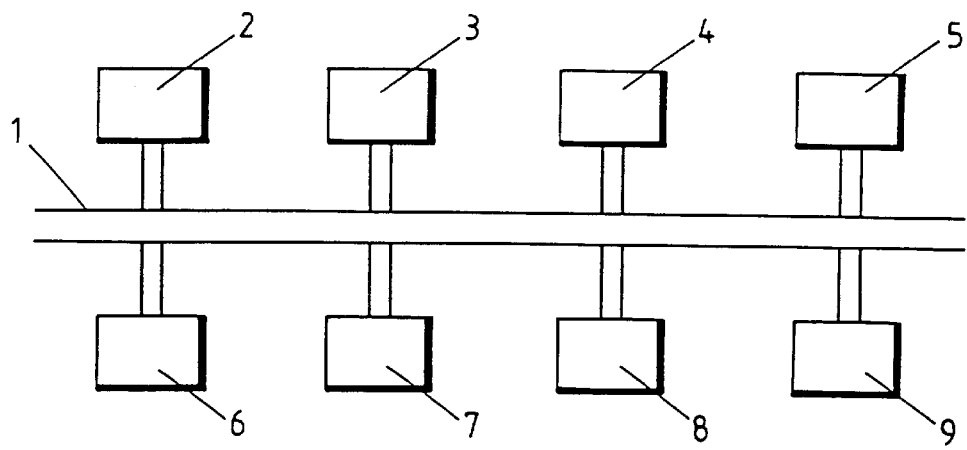
FIG. 1 illustrates a hardware structure according to a possible embodiment of the microcomputer according to the invention.

The microcomputer according to the invention, the hardware of which is shown in FIG. 1, comprises a bus structure 1, onto which different hardware units 2–9 are connected, such as for example a video adapter 2 onto which a monitor is connectable, a memory 3, a keyboard 4 or another user interface, a hard disc controller 5, a serial port 6, a parallel port 7 and a central processing unit 8. These hardware units 2–8 are usually present on the current PC's. According to the invention, at least one hardware interface 9 is additionally connected to the bus structure 1. The hardware interface is provided for realising communications between the PC and at least one controllable member, which is controlled according to the state of the art by a PLC, such as a motor, a valve or switches, connectable to this hardware interface. In the most simple configuration, the hardware interface 9 is for example formed by a digital in/output card.

According to other embodiments, one or several of the following hardware interfaces are connected: a network adapter for realising network communication, an analogue in/output card, a stepping motor controller, a servo motor controller, a multimedia card for reading and/or processing video and audio and a sound card. Also several digital in/output cards can for example be connected.

The hardware interfaces can be dedicated processing cards or not, such as for example said stepping motor and servo motor controllers. Such dedicated processing cards are provided of an own processing capacity and comprise to this end for example an own microprocessor. The advantage of such cards is that they offer the possibility to process themselves at least a number of the execution instructions and to further convert them into control signals in order to supply them to the controllable member and to process themselves at least a part of the data, supplied by the controllable member, and supplying thereby a control signal to the member. In this way, it is possible to enable a number of the generated PLC-instructions to be processed directly by the programmable card itself, whereby the controllable member is controlled less dependently from the central processing unit of the microcomputer (i.e. in real time). Certain signals are forwarded to the operating system of the microcomputer, so that it is informed that the instruction(s) is (are) processed by the card. Consequently, the processing of at least a number of instructions is performed by the card itself under supervision of the microcomputer operating system.

The dedicated processing cards can further be programmable. Upon switching on the microcomputer, such a programmable card has only an own BIOS, from which the configuration of the card is retrieved and identification means, indicating which instructions can be processed by this card. The instruction generator retrieves from the identification means which machine codes corresponding therewith can be processed by the card. In this way, it is possible to load only these machine codes which are required for this application in the programmable card, whereby an efficient use is made of the processing time of the card.

Figure 2:
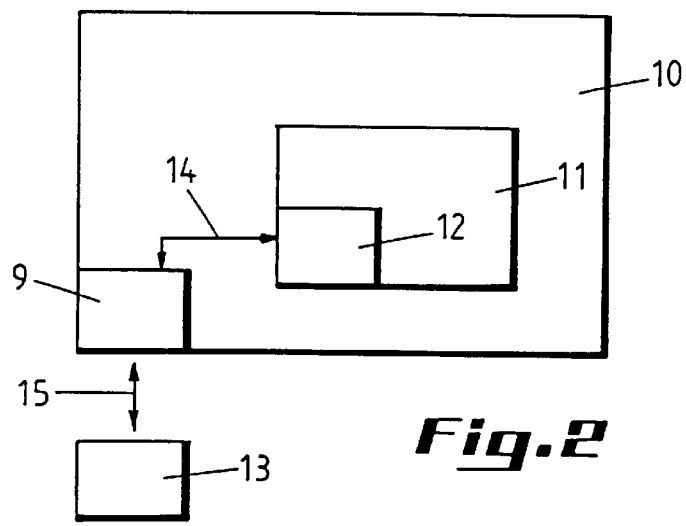
FIG. 2 illustrates schematically the data flow in the microcomputer according to the invention, FIG. 3 gives an example of members which are controlled by means of microcomputer according to the invention.

As shown in FIG. 2, the PC 10 comprises i.a. an operating system 11. According to the invention, an instruction generator 12 is additionally incorporated in the operating system 11 of the microcomputer. This instruction generator 12 is provided for generating programmable logical controller's instructions, shortly PLC-instructions, such as i.a. established by the IEC1131 standard. These PLC-instructions are converted in machine codes by a compiler or an interpreter, which is a part of the instruction generator 12, under control of the operating system 11. The machine codes are converted into execution instructions by the central processing unit and these execution instructions reach via the bus structure 1 the hardware interface 9 and are converted there in control signals.

If use is made of a dedicated processing card as hardware interface, at least a number of the execution instructions are processed by the programmable card itself and converted into control signals.

These control signals are then supplied to the controllable member, for example a motor 13. Communication is also possible from the members towards the instruction generator 12. This two-way communication is represented by the double arrows 14 and 15. Preferably, the microcomputer according to the invention comprises interruption means for interrupting temporarily the data flow through 14. These interruption means are known means for the microcomputer. These means can be used due to the fact that the members are directly controlled by the microcomputer, since the instruction generator is incorporated in the operating system of the microcomputer, and not by a separate PLC, such as in the current state of the art.

Also the dedicated processing cards dispose preferably of said interruption means, whereby a number of PLC-instructions is performed, even if under supervision of the PC, independently on the card. This occurs for example for said stepping and servo motor controllers, whereby end switches are for example monitored on the card via the interruption means.

Figure 5:
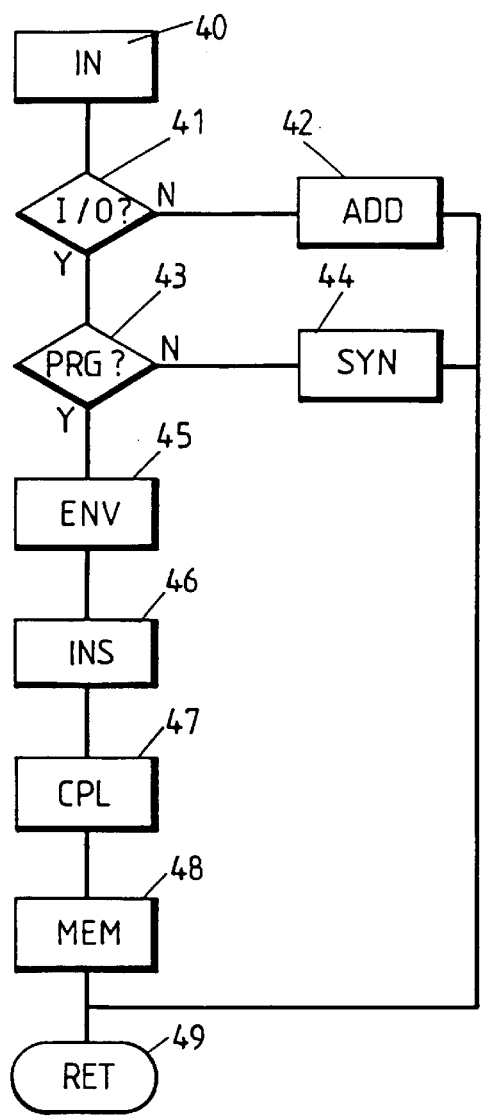
FIG. 5 illustrates a flowchart of a detail from the flowchart in FIG. 4.
Figure 4:
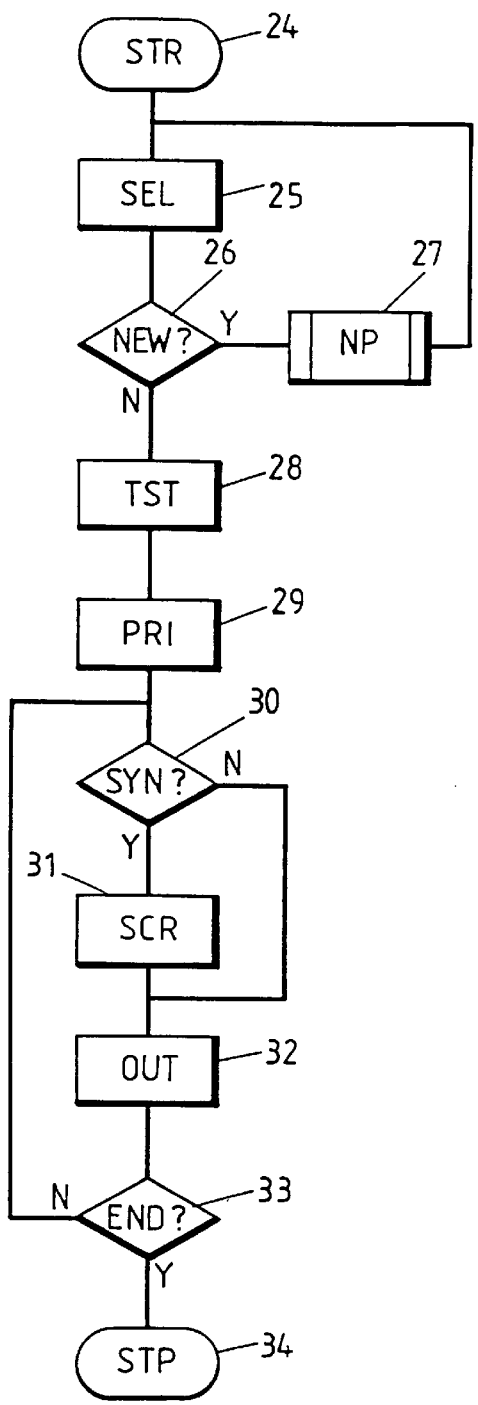
FIG. 4 shows a flowchart for a possible embodiment of the operation he microcomputer according to the invention.

More details about the operation of the microcomputer according to the invention will appear from the description of the flowcharts, illustrated in FIGS. 4 and 5.

Figure 3:
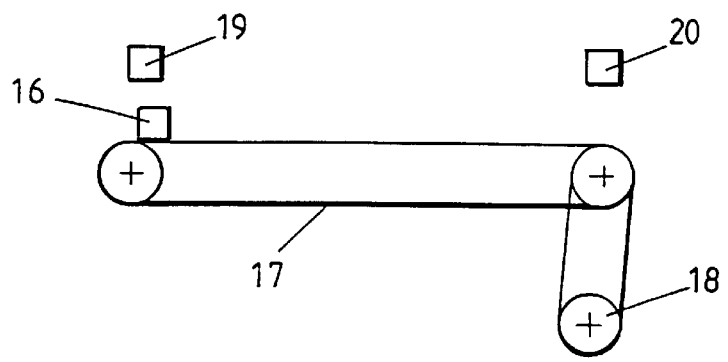

For the sake of clarity, there is started with the following concrete example, illustrated in FIG. 3. An object 16 must be moved from a starting point to an end point. For the movement, use is made of a conveyor 17, driven by a motor 18. By means of a first and a second end switch, 19 and 20, respectively, it is detected if the object 16 is situated at the starting point, respectively the end point.

The movement of the object must occur as follows. The object 16 to be moved is placed at the starting point. In this way, the first end switch 19 detects the presence of this object. Due to the detection, the conveyer 17 is set into operation by the motor 18. Upon reaching the end point, detected by the second end switch 20, the motor 18 and consequently also the conveyer 17 are stopped.

Upon programming this application example, use is made of the following algorithms. If end switch 19 is active (detects the object 16) and 20 not active, switch then motor 18 on. If end switch 20 is active (detects the object 16), stop then motor 18.

In order to achieve this, the status of the two end switches 19 and 20 must be read in the microcomputer according to the invention. To this end, two digital inputs are required. On the basis of the status of the two end switches, the motor 18 is switched on or stopped. For controlling the motor 18, one digital output is required.

The microcomputer according to the invention must consequently be provided with a digital in/output card as hardware interface with at least two digital inputs and one digital output. A digital in/output card with the following characteristics is for example used: 8 inputs, 8 outputs, in/output address adjustable by means of switches between 0x200 and 0x3FF (0x means that the number is hexadecimally represented). Also a card can be used, wherein the addressing is established by the plug and play principle. The card and the BIOS from the microcomputer must support this principle.

The motor 18 is for example connected to the first output of the digital in/output card via a power control. The first and second end switches 19 and 20, respectively, are for example connected to the first and second input, respectively, of the digital in/output card. It is assumed that Windows ® NT is loaded as operating system in the PC. It is clear that instead of this, another operating system can be provided, such as for example OS2, Windows '95 or UNIX. Preferably, the operating system is provided for enabling multitasking, so that if desired, several applications can be executed at the same time with the microcomputer. Windows ® NT is moreover provided with priority management means so that priorities can be established for a PLC-instruction or a sequence of PLC-instructions. The microcomputer can also be provided with several hardware interfaces, programmable or not, or several controllable members can be connected to the microcomputer. Instead of motors, also valves, pneumatic or hydraulic cylinders, or other members controllable by a PLC can be controlled.

The flowcharts, illustrated in FIGS. 4 and 5, describe how the motor is controlled via an existing program of generated PLC-instructions or via a program of PLC-instructions to be generated still to be developed. The instruction generator is provided to convert the PLC-instructions into machine codes. This occurs by the compiler or the interpreter which is a part of the instruction generator. The central processing unit converts these machine codes in execution instructions and these execution instructions are transmitted to the digital in/output card. The digital in/output card converts the execution instructions into control signals, which control the motor via the power control. There is also a data flow from the motor towards the microcomputer.

Preferably, the instruction generator is provided with priority management means enabling to assign a priority to an instruction or sequence of instruction generated by the instruction generator.

As illustrated in FIG. 4, the following steps can be distinguished:

24. STR

In this step, the starting procedure of the PC is performed, wherein the used operating system, in this case Windows ® NT, is initialised. The user chooses PLC-application, which is loaded in the Windows ® NT operating system. In a possible embodiment, this occurs by clicking the icon, corresponding to the PLC-application, with a mouse. If the user chooses another application, this other application is started up and processed. Since this falls outside the scope of this patent, the latter will not be described further in detail.

25. SEL

The user chooses either to use an existing program of PLC-instructions and machine codes associated therewith, loaded in the memory of the PC, or to write a new program of PLC-instructions. Upon choosing an existing program, he selects then also the desired program.

26. NEW?

Here, there is checked if the user wants to write a new program.

27. NP

Upon choosing a new program, there is switched over to the routine "new program" which is illustrated in FIG. 5 and which will be further described in detail.

28. TST

Here, checks are performed to verify if the required hardware for performing the application is present and addressable. This physical check routine occurs in a way which is usual for the PC, for example by addressing the hardware, such as the digital in/output card, and consequently by verifying if the hardware reacts in the correct way. If an error is found in this respect, then this error must first be corrected before further proceeding.

29. PRI

Since in this case use is made of an operating system provided with priority management means, the user can, such as already noted, assign by means thereof a priority to certain instructions or sequences of instructions, and this according to the priority system of Windows ® NT. The user can for example indicate here that updating the synoptic display on the monitor receives a lower priority than the processing of the status of the end switches. It can be assumed that a certain default priority is present, but that the user can change it.

30. SYN

Here, there is checked if there is a synoptic processing of the instructions, in other words if information concerning the instructions, performed by the controllable member, can appear on the monitor.

31. SCR

If synoptic processing exists, the monitor is updated with the most recent information. As synoptic processing, use is for example made of the representation illustrated in FIG. 3. By making for example use of colours, the status of the end switches 19 and 20 are illustrated on the monitor, and also if the motor 18 and consequently the conveyer 17 are turning or are stopped.

32. OUT

When the user gives a command for the execution, the execution of the programmed PLC-instructions, which were already converted into machine codes, such as will be described further, is started. The machine codes are thereby converted by the central processing unit into execution instructions. This occurs in a usual way for a PC. These instructions arrive in the addressed in/outputs of the digital in/output card. The addressing of the in/output card is further described in the description of FIG. 5. The digital in/output card converts the execution instructions in signals which are supplied to the controllable motor. In the opposite way, data comes from the end switches to the instruction generator. This data indicates if an object 16 is situated or not at the starting or end point of the conveyer 17. If the object 16 is situated at the starting point of the conveyer, then a data signal flows towards the instruction generator. According to the algorithm, the motor must then be started. An execution instruction is thereby generated by the central processing unit starting from the machine codes, which instruction is transmitted to the first output of the digital in/output card. This output sends a signal to the motor 18 to start it. If the object 16 is situated at the second end switch 20, then an analogue reasoning can be followed. The signals, thus coming from the end switches 19 and 20 are used to control the motor.

33. END?

Here, there is checked if the execution must be terminated. In practice, the user can terminate the execution himself by pressing for example a certain function key.

34. STP

This terminates the PLC application.

Before describing FIG. 5, it is important to note that according to one embodiment, the chosen application can be temporarily interrupted at any time by activating for example another application. To this end, the microcomputer must be provided to be able to perform multitasking.

FIG. 5 is a flowchart which illustrates in detail which steps are followed upon choosing a new program NP 27, such as shown in FIG. 4. By that, there is meant both the proper programming of new instructions and the establishment of addresses and the synoptic displays. The sequence wherein this must occur is not of essential importance: the establishment of the addresses can for example occur both before and after the programming of the instructions, the establishment of synoptic displays can for example both occur before and after compiling.

40. IN

The user makes here his choice if he wants to program instructions, or to establish in- and output addresses or synoptic displays.

41. I/O?

Here, there is checked if the user has chosen "in- and output addresses".

42. ADD

If the user has chosen in- and output addressing, the addresses are assigned here. Upon using said digital in/output card, the addresses are adjusted by means of switches. Suppose that for this card, the addresses 0x200 and 0x201 are intended to be used. In binary form, this is 0010 0000 0000 and 0010 0000 0001. The last bit is thus 0 or 1. Since the 11 other bits are fixed, the 11 switches of the digital in/output card must be adjusted. This addressing is proper to the card. Other cards are known with the so-called "plug and play" mechanism, wherein the address is established by this mechanism instead of by switches. In case of a data bus of 8 bits, all in- and outputs are now established and have for example as name input 1 to input 8 and output 1 to output 8. In order to be able to program more user-friendly, it is useful to give an own name to each of the in- and outputs to which a member is connected. According to a preferred embodiment, symbols, which are retrieved from the memory or which are own made, are coupled to the in- and outputs. In this way, the first and second end switches, 19 and 20, respectively, are for example coupled to input 1 and 2, respectively, by means of symbols and/or in/output variables. The symbols possibly comprise an indication in order to distinguish them from one another. In the symbol of the first end switch "min" can for example be indicated and in the second end switch "max".

43. PRG?

Here, there is checked if the user has chosen "programming instructions".

44. SYN

If the user has chosen "synoptic displays", the symbols from the in- and outputs are shown on the monitor. These symbols are stored in the memory and are for example selected by clicking in a menu. The different symbols are, if necessary, connected to one another in an appropriate manner in order to illustrate graphically the interaction between the symbols. In this way, the motor 18 is for example connected to the conveyer 17 and the end switches 19 and 20 must be connected to the object 16.

According to a preferred embodiment, the microcomputer is provided with a symbol generator, so that the user can himself make symbols and can use them subsequently for the display on the monitor. It is also possible to make a new symbol, starting from a group of symbols, which form one entity. Each symbol is combined with an instruction or a group of instructions which are processed by the instruction generator. The input of instructions occurs in step INS 46.

45. ENV

The user chooses here according to which pattern he wants to program. The existing patterns correspond to the patterns of certain trademarks for programming PLC's according to the classical way. In this way, an Allen Bradley ® patterns, a Simatic ® pattern from Siemens ® are known. A standardised pattern also exists, i.e. according to the IEC 1131 standards. It could also be possible to program according to a new graphical pattern, wherein use is made of symbols, which can be retrieved from the memory or which can be own made.

46. INS

The PLC-instructions are here generated according to the predetermined pattern by making for example use of a keyboard and/or a mouse. According to another embodiment, the instructions are generated by making a choice by means of a graphical pen on a menu which appears on a touch-screen. If use is made of a graphical pattern, one or several PLC-instructions have to be combined with the symbols, besides selecting a number of symbols and combine them to one another. This is further processed by the instruction generator. The used symbols are preferably further used as synoptic display on the monitor, upon execution of the instructions by the controllable member.

47. CPL

The generated PLC instructions are compiled here, wherein the PLC-instructions are converted by the instruction generator into machine codes, intelligible for the PC, and if applicable for the programmable card(s). In this case, the machine codes are subdivided in blocks, wherein certain blocks are provided to be loaded on the programmable card(s) and other on the PC itself. This conversion usually occurs in different steps: first of all, the PLC-instructions are converted into pseudo-codes, which are converted in another code, for example $C^{++}$ codes, which in turn are converted into machine codes. In another embodiment, the PLC instructions are converted into machine codes by an interpreter. The programmed instructions can now be used for controlling a controllable member.

48. MEM

The program of PLC-instructions and machine codes, in/output variables and symbols associated therewith, are, if desired, stored in the memory, in order to be able to select them later from the memory.

49. RET

The procedure "new program" is terminated here.

Consequently, there is returned to the flowchart, illustrated in FIG. 4.

By way of illustration, a description is now given of possible situations upon processing a PLC-instruction by making use of the microcomputer according to the invention.

There is assumed that use is made of a PC with a standard multitasking operating system. Nowadays, the existing multitasking operating systems are non real-time systems. For certain instructions, a real-time problem can occur. This means that the instructions are processed and performed too slowly. This real-time problem can be solved by making a choice of well-determined hardware interfaces.

If a digital in/output card is used, the multitasking operating system of the PC can process the instructions directly, for example with response times of 10 msec, as long as the number of in- and outputs and/or instructions is limited. If the number of in- and/or outputs increases upto a couple of hundreds, then the response time become too high, if the instructions must completely be processed by the multitasking operating system. Also if instructions must be read with a high repeating frequency, for example 20 kHz, and these instructions are to be processed within one short period, then these instructions can not be processed by the multitasking operating system of the PC itself.

In this case, it is necessary to use a dedicated processing card, so that a number of instructions are processed by the card itself. A part of the information, such as for example the status of the in- and outputs, are transmitted to the operating system of the PC, so that this information can for example be shown on a monitor or can be used by the PC for processing other instructions, such as for example intensive mathematical calculations. The instructions which are processed by the dedicated processing card, can be seen, in one case, as a subprogram and the instructions which are processed by the PC, can be seen as a main program, wherein the main program is interrupted by the subprogram. In another case, the instructions, which are processed by the dedicated processing card, can be seen as a child program which is started and stopped from the main program, thereby making the child and main program parallelly active. All this occurs according to programming standards of i.a. the IEC1131 standardised PLC language.

Some instructions can not be processed by the operating system of the PC, but only on a dedicated processing card. An example thereof is motion control. Since the instructions must in the most cases be executed certainly within 1 msec and sampling times of 10 $\mu$sec can occur, a dedicated processing card must be connected to this end to the bus structure from the PC. The instructions for executing motions are processed by the dedicated processing card, in this case a motion controller, and communication with the PC is herein limited to the transmission of information such as position, velocities, accelerations of the movements, and the like. If such a card is not connected, then such instructions can not be processed. In this case, the system could generated an error message.

The decision about which instructions are processed by the dedicated processing cards occurs upon compiling the PLC-instructions. The question to be asked is the following one: can the PLC-instruction be processed by the hardware interface? If yes, then the PLC-instruction must preferably be compiled to the machine code from the hardware interface, so that the instruction will actually be processed by the hardware interface. If no, can the PLC-instruction be processed by the PC? If yes, then the PLC-instruction must be compiled to the machine code from the PC. If no, an error message must preferably be generated.

If use is made of a programmable dedicated processing card, then certain parts of the program are loaded in the PC and other parts on the programmable dedicated processing card, upon selecting the compiled program.

EXAMPLE

There is started from the following instruction if input 1 is active, then a counter is started, and after the predetermined time of the counter has passed, output 1 is activated. It is clear that such a simple instruction can be processed by the operating system of the PC. By way of illustration, it is nevertheless described below the conditions for letting these instructions be processed by a hardware interface. The processing of PLC-instructions generally occurs as follows:

1. The inputs are read.
2. The instructions are executed.
3. The outputs are updated.

If a hardware interface is used with only in- and outputs, then the instruction can not entirely be incorporated in the interface. The processing of this instruction, wherein a counter is started, occurs in the operating system of the PC.

If the scanning cycle of the program is too long, it is advisable to use dedicated processing cards to process a number of instructions in these cards, so that the response times of the in- and outputs are limited. In this example, a card should then be provided which is also provided, besides in/outputs, with a counter and which is provided to process this determined function itself or which is programmable for loading the function in the card.

What is claimed is:

1. A microcomputer comprising a bus structure on which at least a memory and a user interface are connected, said microcomputer having an operating system provided for processing at least one PC application, said microcomputer further comprising:
   (a) an instruction generator, incorporated in the operating system, provided for generating programmable logical controller's instructions for controlling a plurality of controllable members and for converting the programmable logical controller's instructions into machine codes under control of the operating system,
   (b) at least one hardware interface, connected to said bus structure, provided for co-operating with the instruction generator, and
   (c) a central processing unit, connected to said bus structure and provided for converting the machine codes into execution instructions and for supplying these execution instructions via said bus structure to the hardware interface, whereby said hardware interface is provided for
      converting said execution instructions into control signals for controlling said plurality of controllable members,
      selectively supplying said control signals to said plurality of controllable members which are connectable onto said hardware interface, and
      receiving data supplied by said controllable members and forwarding them to said instruction generator.

2. The microcomputer according to claim 1, wherein said operating system is provided with priority management means.

3. The microcomputer according to claim 1, wherein said instruction generator is provided for generating programmable logical controller's instructions standardized according to a predetermined pattern.

4. The microcomputer according to claim 1, wherein symbols are stored in said memory, and wherein said instruction generator is further provided for retrieving these symbols from the memory and for generating combined PLC-instructions with said symbols, which microcomputer further comprises a monitor connected to a video adapter, and said instruction generator being further provided for displaying the retrieved symbols on the monitor.

5. The microcomputer according to claim 1, wherein the microcomputer comprises a symbol generator, provided for generating symbols, storing these generated symbols in the memory, and wherein said instruction generator is further provided for retrieving these symbols from the memory and for generating therewith combined PLC-instructions, which microcomputer further comprises a monitor connected to a video adapter, and said instruction generator being further provided for displaying the retrieved symbols on the monitor.

6. The microcomputer according to claim 1, wherein symbols are stored in said memory, wherein said instruction generator is further provided for retrieving these symbols from the memory and for generating combined PLC-instructions with said symbols, which microcomputer further comprises a monitor connected to a video adapter, and said instruction generator being further provided for displaying the retrieved symbols on the monitor and wherein said instruction generator is further provided for further using said symbols as a synoptic display on the monitor of the instructions executed by the controlled members upon processing.

7. The microcomputer according to claim 1, wherein the microcomputer comprises a symbol generator, provided for generating symbols, storing these generated symbols in the memory, wherein said instruction generator is further provided for retrieving these symbols from the memory and for generating therewith combined PLC-instructions, which microcomputer further comprises a monitor connected to a video adapter, and said instruction generator being further provided for displaying the retrieved symbols on the monitor, and wherein said instruction generator is further provided for further using said symbols as a synoptic display on the monitor of the instructions executed by the controlled members upon processing.

8. The microcomputer according to claim 1, wherein said hardware interface is a dedicated processing card provided for processing itself a number of the execution instructions and converting them into said control signals in order to supply them to the controllable members and for processing itself at least a part of data, supplied by the controllable members, and for supplying thereby a control signal to the members.

9. The microcomputer according to claim 1, wherein said hardware interface is a dedicated programmable processing card provided for processing itself a number of the execution instructions and converting them into said control signals in order to supply them to the controllable members and for processing itself at least a part of data, supplied by the controllable members, and for supplying thereby a control signal to the members.

* * * * *